(12) United States Patent
Ginzboorg et al.

(10) Patent No.: US 9,210,578 B2
(45) Date of Patent: Dec. 8, 2015

(54) METHODS AND APPARATUS FOR AUTHENTICATION

(75) Inventors: Philip Ginzboorg, Espoo (FI); Kari J. Leppanen, Helsinki (FI); Pentti Valtteri Niemi, Rymattyla (FI); Markku T. Turunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 134 days.

(21) Appl. No.: 13/547,512

(22) Filed: Jul. 12, 2012

(65) Prior Publication Data
US 2014/0019763 A1    Jan. 16, 2014

(51) Int. Cl.
*H04L 29/06* (2006.01)
*H04W 12/10* (2009.01)
*H04W 84/18* (2009.01)

(52) U.S. Cl.
CPC ............ *H04W 12/10* (2013.01); *H04L 63/104* (2013.01); *H04L 63/123* (2013.01); *H04W 84/18* (2013.01)

(58) Field of Classification Search
USPC ................................................. 713/161–163
See application file for complete search history.

(56) References Cited

U.S. PATENT DOCUMENTS

| | | | |
|---|---|---|---|
| 6,348,875 B1* | 2/2002 | Odinak et al. ............... 340/9.11 |
| 2004/0080427 A1 | 4/2004 | Odinak et al. ............ 340/825.52 |
| 2005/0129236 A1 | 6/2005 | Sharma ......................... 380/259 |
| 2005/0257255 A1* | 11/2005 | Quick et al. ....................... 726/9 |
| 2007/0083561 A1* | 4/2007 | Lai et al. .................... 707/104.1 |
| 2009/0190598 A1* | 7/2009 | Christensen et al. ..... 370/395.53 |
| 2009/0220081 A1* | 9/2009 | Schneider ...................... 380/255 |
| 2011/0010547 A1* | 1/2011 | Noda .............................. 713/168 |
| 2011/0238997 A1* | 9/2011 | Bellur et al. .................. 713/176 |
| 2012/0114124 A1* | 5/2012 | Du et al. ........................ 380/278 |

FOREIGN PATENT DOCUMENTS

| | | |
|---|---|---|
| EP | 2117200 A1 | 11/2009 |
| JP | 2013074322 A | 4/2013 |
| WO | WO-2007/108660 A1 | 9/2007 |

OTHER PUBLICATIONS

Hegland et al., "A survey of key management in ad hoc networks," Communications Surveys & Tutorials, IEEE Year: 2006, vol. 8, Issue: 3 pp. 48-66.*
Jung et al., "The Effective Group Key Agreement Protocol for Ad-Hoc Networks for Medical Emergency Environments," SICE-ICASE, 2006. International Joint Conference, pp. 1127-1130.*
Zhou, Y. et al.; "Securing Wireless Sensor Networks: A Survey"; IEEE Communications Surveys & Tutorials; Jul. 2008; vol. 10, No. 3; p. 6-28.

* cited by examiner

*Primary Examiner* — Roderick Tolentino
(74) *Attorney, Agent, or Firm* — Harrington & Smith

(57) ABSTRACT

Message authentication in an ad-hoc network. Upon creation of a message, a message authentication code is created using a key shared with members of a group comprising a subset of nodes of the ad-hoc network. The message authentication code may be created using a cryptographic process having the message and a message identifier as inputs. After or in parallel with broadcast of the message, a pointer to the message is broadcast. The message authentication code is publicly broadcast and those members of the group among which the key has been shared are able to authenticate the message as coming from a particular sender.

21 Claims, 5 Drawing Sheets

METHODS AND APPARATUS FOR AUTHENTICATION

TECHNICAL FIELD

The present invention relates generally to message transmission. More particularly, the invention relates to mechanisms for authenticating a sender of a message.

BACKGROUND

Ad-hoc networks provide for rapid and informal assembly and dispersal of groups of communicating devices, as member nodes come into contact with one another and transmit messages. A mesh network comprises a plurality of nodes that cooperate to transmit messages, with some of the nodes serving as relays for other nodes. A node may be any suitable wireless device, such as a cellular telephone, wireless network station or access point, or the like, having the capability to transmit and receive messages using mechanisms that can also be used by other nodes in the network.

In order to provide for a higher quality of service for all nodes, it may be desirable for all capable nodes within a geographical vicinity to join in a single network. This approach increases the number of possible relay stations and helps insure the delivery of messages. However, users of some of the nodes may have shared interests with one another and may identify themselves to one another as members of a group. These users may not share a similar level of shared interests with other nodes in the vicinity.

SUMMARY

According to one embodiment of the invention, an apparatus comprises at least one processor and memory storing computer program code. The computer program code is configured to, with the memory and the at least one processor, cause the apparatus to at least create a message authentication code using a shared key, wherein the shared key is accessible to at least one node belonging to a group with which the apparatus is associated and configure a message for broadcast over the ad-hoc network, wherein the message includes the message authentication code, and also to configure for broadcast, over the ad-hoc network, a pointer to the message.

In another embodiment of the invention, a method comprises creating a message authentication code using a shared key, wherein the shared key is accessible to at least one node belonging to a group with which the apparatus is associated and configuring a message for broadcast over the ad-hoc network, wherein the message includes the message authentication code, and also configuring for broadcast, over the ad-hoc network, a pointer to the message.

In another embodiment of the invention, a computer readable medium stores a program of instructions. Execution of the program of instructions by a processor configures an apparatus to at least create a message authentication code using a shared key, wherein the shared key is accessible to at least one node belonging to a group with which the apparatus is associated and configure a message for broadcast over the ad-hoc network, wherein the message includes the message authentication code and also to configure for broadcast, over the ad-hoc network, a pointer to the message.

BRIEF DESCRIPTION OF THE DRAWINGS

FIG. 5 illustrates a communication device according to an embodiment of the present invention.

DETAILED DESCRIPTION

Embodiments of the present invention recognize that a group of nodes within radio transmission range of one another may form a common network to assist one another in the transmission of messages, but that subgroups may exist within the larger group. Users of nodes within a subgroup may specifically direct messages to other members of the subgroup. While such users may be willing that their messages will be read by the larger group, the users may be interested in authenticating their messages only to members of the subgroup, positively identifying the origin of their messages only to their fellow subgroup members.

Figure 1:
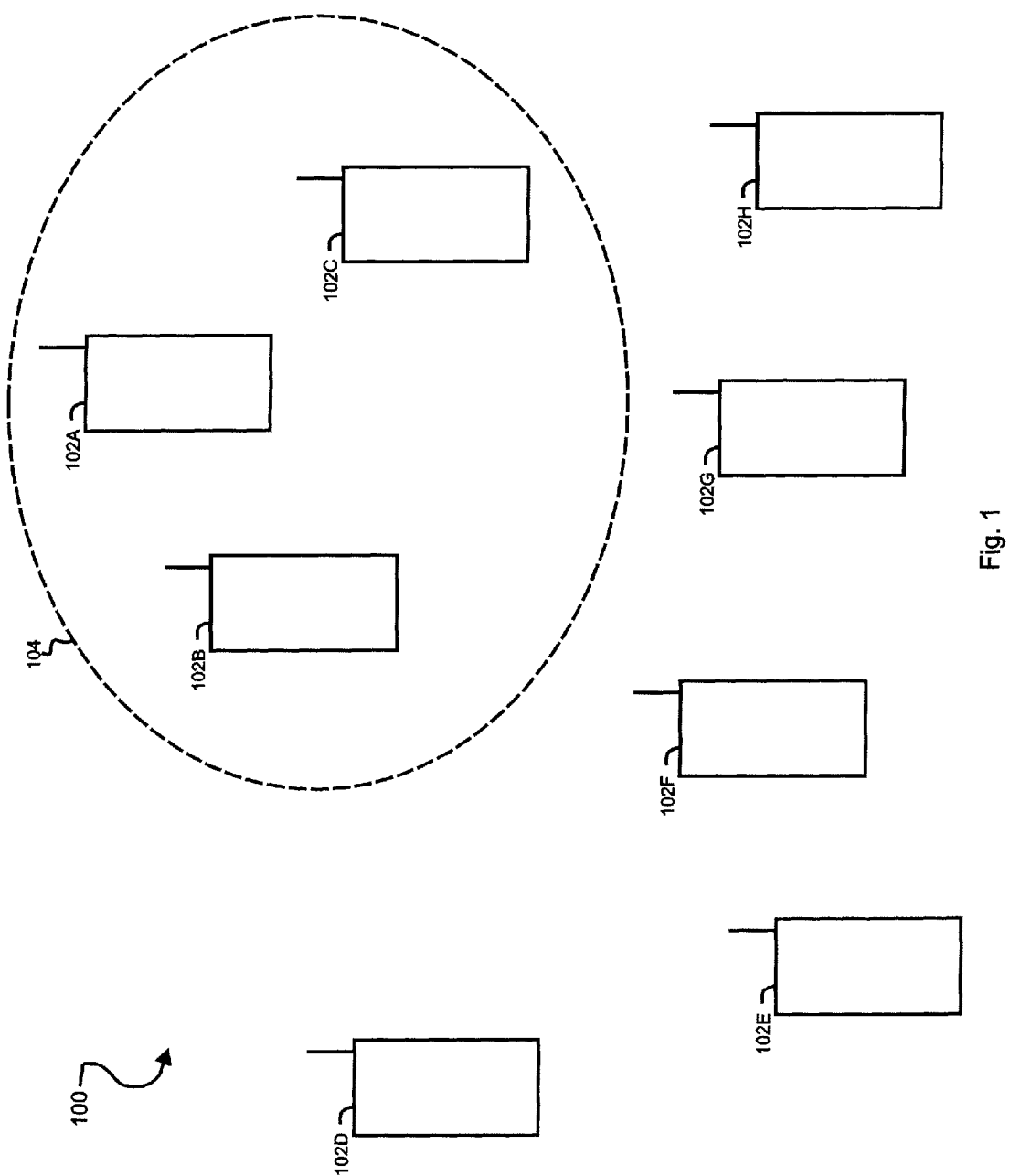
FIG. 1 illustrates a network employing authentication according to an embodiment of the present invention.

FIG. 1 illustrates an ad-hoc network 100, comprising a plurality of cooperating user devices 102A-102H. The devices 102A-102H may also be referred to as nodes 102A-102H. The devices 102A-102C are members of a smaller group 104, which may be referred to as a friends group 104. The nodes of the network 100 transmit public messages, readable by all members of the network, but the users of the nodes belonging to the group 104 wish to authenticate their messages to one another.

Suppose, then, that the node 102A is used to transmit a message that can be authenticated by members of the group 104. The node 102A broadcasts a message M, including a message authentication code (MAC). The node 102A subsequently, or in parallel, broadcasts a pointer to the message indicating that it has sent the message. The MAC is the output of a cryptographic function, suitably a one-way function, keyed with a key K shared among members of the group 104. The inputs to the function include the text M and the identifier of the message. The MAC may suitably be 4 bytes in length and may, for example, be the output of a one-way function such as HMAC SHA256, with the output truncated to 4 bytes. The members of the group 104 (as well as the rest of the members of the network 100) receive the identifier and the message, including the MAC. However, only the members of the group 104 have the shared key K, so that only the members of the group 104 have the needed inputs to the one-way function that yielded the MAC. The members of the group 104, then, are able to verify that the message M came from the node 102A. The pointer serves as an alert to those who wish to authenticate the message that the message has originated from the node 102A. A recipient who is able to authenticate the message using the MAC is therefore alerted to use the key K to verify the message.

Rather than transmitting a separate pointer, a user may simply include a predictable portion in a message. For example, the node 102A may broadcast a message, encrypted using the key K, or another key that is known only by the members of the group, that subsequent public messages will include a specified nickname such as "skywalker:34159". The presence of the nickname serves as an alert that the message is from the node 102A. The nickname may, however, be non-unique in the network 100, and it is likely to be possible to include the nickname in a message in an attempt at impersonation. If the message includes a MAC computed with the key K, however, the message can be authenticated using the MAC, with a recipient being notified by the presence of the nickname that the key K is to be used.

As an alternative or in addition to the use of a nickname by a user, all nodes in the group 104 may use a group pseudonym precomputed by the group members, or precomputed by one group member and distributed to the other group members. The pseudonym may be encrypted with a shared key using an input available to the group members, so as to be opaque to outsiders. The presence of the pseudonym, in the absence of a nickname or message pointer, still alerts recipients that a claim is being made that the message originates from a node that is a member of the group 100.

It is possible for a public message containing a MAC to be authenticated by a user that has access to the key K with which the MAC was encrypted, whether or not the message is followed or accompanied by a pointer. If each of the nodes 104A-104C has its own MAC, a recipient will have two keys and will need to try both keys. If a group includes more nodes, the number of keys that must be tried will be larger. Such an approach is not efficient, and the use of the pointer to alert recipients of the message's origin simplifies authentication.

The use of the pointer limits efficient authentication of a message to members of the group of intended recipients. For privacy, it is desirable to limit knowledge of the pointer's existence to members of the group. For example, one or more embodiments of the present invention may include the pointer in a message encrypted in such a way that it can be decrypted only by intended recipients.

The use of a shared key and an authenticator encrypted with the shared key allows for members of a group having access to the key to impersonate one another. For example, if the user of the node 102B sends a public message using the nickname skywalker:314159 and including a MAC computed with the key K, the message will not be distinguishable from one sent by the user of the node 104A. The possibility of such impersonation can be overcome, for example, by using a digital signature computed using asymmetric cryptography techniques. The digital signature can be encrypted with the shared key K to prevent authentication by users of nodes that do not belong to the group 104. However, digital signatures are typically longer than a MAC such as described here, and the computational effort needed to verify them is greater than for a MAC. Therefore, particularly in cases in which the risk of impersonation by a group member is low or the consequences of such impersonation are not severe, a MAC maybe used.

Another approach to preventing impersonation by a group member is the control of the operation of devices that may serve as the nodes 104A-104H, so that a device can create a MAC using only its own key and can verify, but not create, a MAC using another user's shared key. Such restrictions may be enforced in the device, for example, using a secure hardware module.

Figure 2:
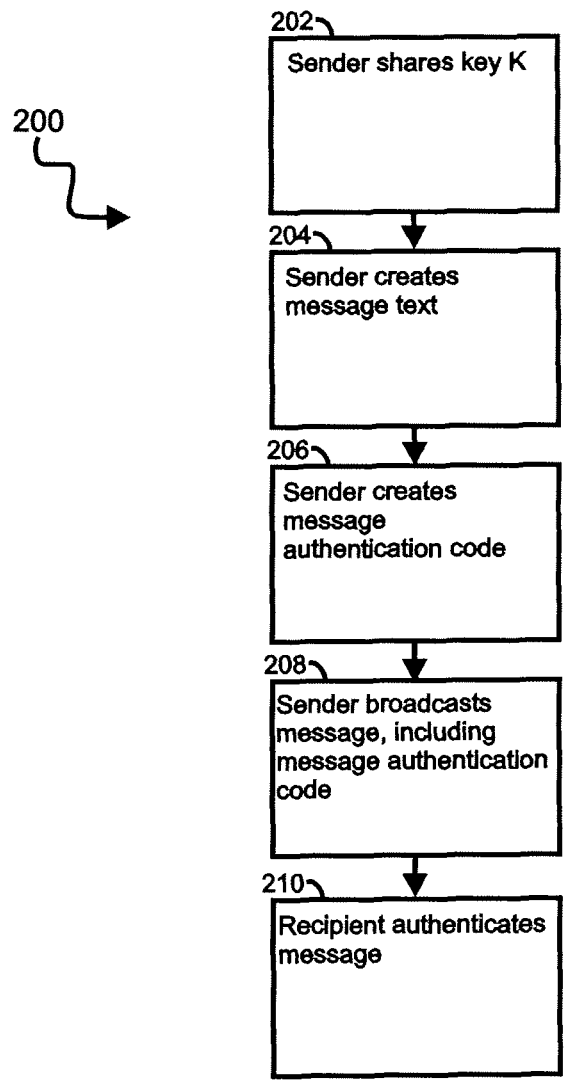
FIGS. 2-5 illustrate processes according to embodiments of the present invention.
Figure 3:
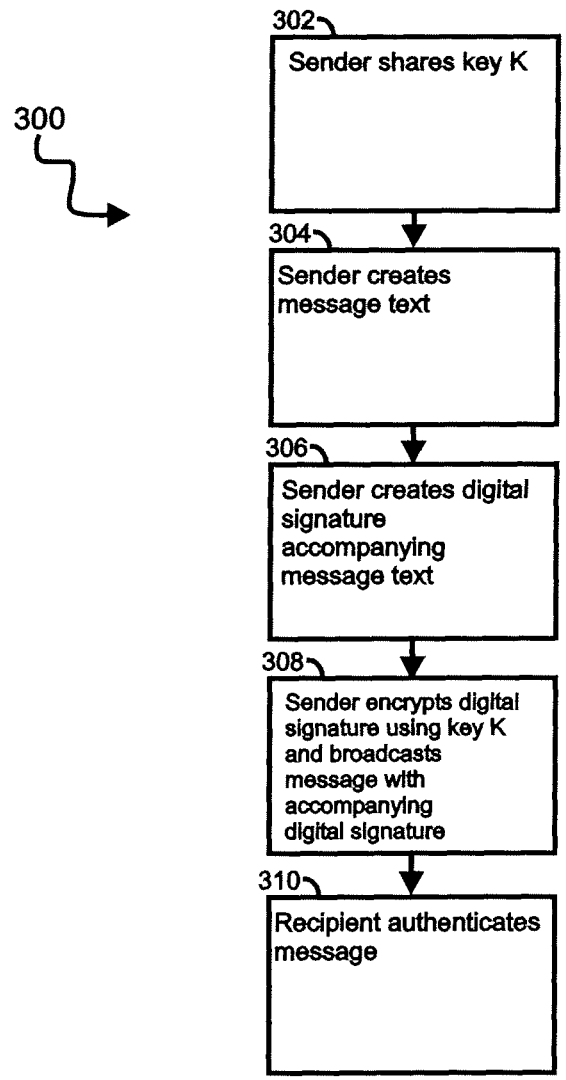

FIG. 2 illustrates a process 200 according to an embodiment of the present invention. At step 202, a sender, using a first device being employed as a communication node in an ad-hoc network shares a key K among users of devices forming a group of nodes of which the first device is a member. At step 204, the sender creates message text. At step 206, the sender creates a message authentication code, suitably using a cryptographic process using the message and message identifier as inputs, and using the shared key K. At step 208, the sender broadcasts the message, including the message authentication code. At step 210, a recipient of the shared key K authenticates the message, using the shared key K, the message, and the identifier of the message to recreate the message authentication code. In at least one embodiment of the invention, the recipient is able only to verify the message authentication code using the key K and cannot create a message authentication code using the key K, due to restrictions imposed by his or her device. FIG. 3 illustrates a process 300 according to another embodiment of the present invention, in which a sender uses a digital signature to allow for message authentication. At step 302, a sender using a first device being employed as a communication node in an ad-hoc network shares a key K among users of devices forming a group of nodes of which the first device is a member. At step 304, the sender creates message text. At step 306, the sender creates a digital signature accompanying the message text. The digital signature may suitably be created using asymmetric cryptography. At step 308, the sender encrypts the digital signature using the key K, and broadcasts the message with the accompanying encrypted digital signature. At step 310, a recipient having access to the shared key K authenticates the message.

Figure 4:
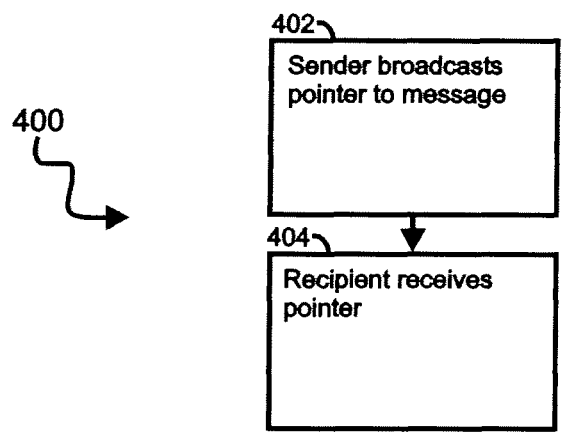

FIG. 4 illustrates a process 400 according to an embodiment of the present invention. At step 402, a sender of a message, which may suitably have been created and broadcast using a process such as the process 200 of FIG. 2 or the process 300 of FIG. 3, broadcasts a pointer to the message. At step 404, a recipient of the message receives the pointer and is thus informed of the existence of the message and informed of the identity of the claimed sender of the message. Being informed of the identity of the claimed sender of the message lets the recipient know which shared key is to be used to authenticate the message.

A process of creating and sending a pointer, such as the process 400 of FIG. 4, may be performed in conjunction with broadcasting the message itself, or may be performed before or after broadcasting the message, depending on design and operational choices.

Figure 5:
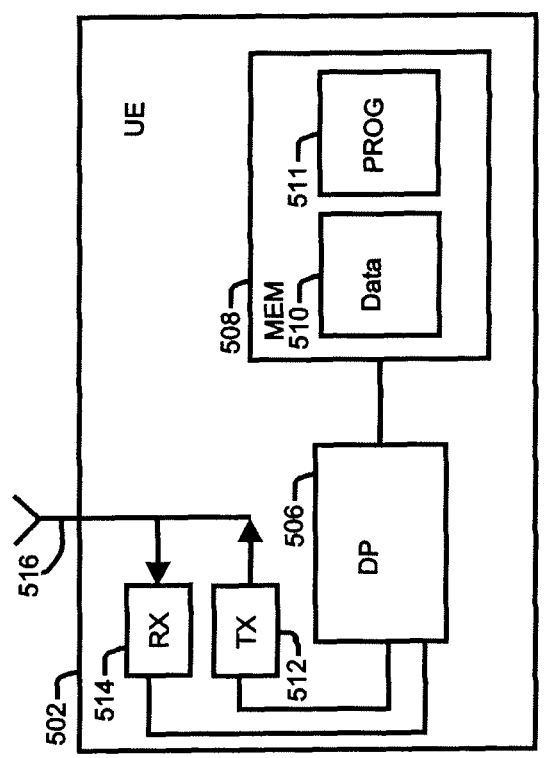

Reference is now made to FIG. 5 for illustrating a simplified block diagram of an electronic device and apparatus that are suitable for use in practicing the exemplary embodiments of this invention. In FIG. 5 an apparatus, such as a mobile device/terminal such as a UE 502, is adapted for communication with other apparatuses having wireless communication capability. The UE 502 may be a user device similar to the devices 102A-102H of FIG. 1.

The UE 502 includes processing means such as at least one data processor (DP) 506, storing means such as at least one computer-readable memory (MEM) 508 storing data 510, at least one computer program (PROG) 511 or other set of executable instructions, communicating means such as a transmitter TX 512 and a receiver RX 514 for bidirectional wireless communications with the eNB 702 via one or more antennas 516.

At least one of the PROGs 511 in the UE 502 is assumed to include a set of program instructions that, when executed by the associated DP 506, enable the device to operate in accordance with the exemplary embodiments of this invention, as detailed above. In these regards the exemplary embodiments of this invention may be implemented at least in part by computer software stored on the MEM 708, which is executable by the DP 506 of the UE 502, or by hardware, or by a combination of tangibly stored software and hardware (and tangibly stored firmware). Electronic devices implementing these aspects of the invention need not be the entire devices as depicted at FIG. 1 or FIG. 5 or may be one or more components of same such as the above described tangibly stored software, hardware, firmware and DP, or a system on a chip SOC or an application specific integrated circuit ASIC.

In general, the various embodiments of the UE 502 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 508 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 506 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein the memory storing the computer program code is configured to, with the at least one processor, cause the apparatus to at least:
   create a message authentication code using a shared key, wherein the shared key is accessible to at least one node belonging to a subgroup with which the apparatus is associated, wherein the subgroup is a subgroup within a larger group of nodes forming an ad-hoc network comprising a plurality of user devices configured to assist one another in transmission;
   broadcast a message over the ad-hoc network, wherein the message includes the message authentication code; and
   broadcast, over the ad-hoc network, a pointer to the message, wherein the pointer includes an identifier of the message and an identifier of a sender of the message and wherein identifier of the sender identifies the shared key used to authenticate the message, and wherein the pointer is broadcast separately from the message.

2. The apparatus of claim 1, wherein broadcasting the pointer comprises configuring the pointer so that the existence of the pointer is known only to members of the group with which the apparatus is associated.

3. The apparatus of claim 1, wherein broadcasting the message further comprises including in the message an identifier associated with a user of the apparatus.

4. The apparatus of claim 3, wherein association of the identifier with the user of the apparatus has been previously indicated to users of nodes belonging to the group with which the apparatus is associated.

5. The apparatus of claim 1, wherein broadcasting the message further comprises including in the message an identifier associated with members of the group.

6. The apparatus of claim 1, wherein the message authentication code comprises a digital signature.

7. The apparatus of claim 1, wherein the shared key is controlled so that a receiving node cannot create a message authentication code for its own messages using the shared key.

8. A method comprising:
   configuring an apparatus to create a message authentication code using a shared key, wherein the shared key is accessible to at least one node belonging to a subgroup with which the apparatus is associated, wherein the subgroup is a subgroup within a larger group of nodes forming an ad-hoc network comprising a plurality of user devices configured to assist one another in transmission;
   broadcasting by the apparatus a message over the ad-hoc network, wherein the message includes the message authentication code; and
   broadcasting by the apparatus, over the ad-hoc network, a pointer to the message, wherein the pointer includes an identifier of the message and an identifier of a sender of the message and wherein identifier of the sender identifies the shared key used to authenticate the message, and wherein the pointer is broadcast separately from the message.

9. The method of claim 8, wherein the pointer is configured so that the existence of the pointer is known only to members of the group with which the apparatus is associated.

10. The method of claim 8, wherein the message includes an identifier associated with a user of the apparatus.

11. The method of claim 10, wherein association of the identifier with the user of the apparatus has been previously indicated to users of nodes belonging to the group with which the apparatus is associated.

12. The method of claim 8, wherein the message includes an identifier associated with members of the group.

13. The method of claim 8, wherein the message authentication code comprises a digital signature.

14. The method of claim 8, wherein the shared key is controlled so that a receiving node cannot create a message authentication code for its own messages using the shared key.

15. A non-transitory computer readable medium storing a program of instructions, execution of which by a processor configures an apparatus to at least:
   create a message authentication code using a shared key, wherein the shared key is accessible to at least one node belonging to a subgroup with which the apparatus is associated, wherein the subgroup is a subgroup within a larger group of nodes forming an ad-hoc network comprising a plurality of user devices configured to assist one another in transmission; and
   broadcast a message over the ad-hoc network, wherein the message includes the message authentication code; and
   broadcast by the apparatus, over the ad-hoc network, a pointer to the message, wherein the pointer includes an identifier of the message and an identifier of a sender of the message and wherein the identifier of the sender identifies the shared key used to authenticate the message, and wherein the pointer is broadcast separately from the message.

16. The computer readable medium of claim 15, wherein broadcasting the pointer comprises configuring the pointer so that the existence of the pointer is known only to members of the group with which the apparatus is associated.

17. The computer readable medium of claim 15, broadcasting the message further comprises including in the message an identifier associated with a user of the apparatus.

18. The computer readable medium of claim 17, wherein association of the identifier with the user of the apparatus has been previously indicated to users of nodes belonging to the group with which the apparatus is associated.

19. The computer readable medium of claim 15, wherein broadcasting the message further comprises including in the message an identifier associated with members of the group.

20. The computer readable medium of claim 15, wherein the message authentication code comprises a digital signature.

21. The apparatus of claim 1, wherein:
the message authentication code is included in a first message;
the pointer is a pointer to the first message;
the pointer is configured for broadcast in a second message different from the first message; and
broadcasting the first message over the ad-hoc network is followed by broadcasting the second message over the ad-hoc network.

\* \* \* \* \*